Patented Dec. 2, 1947

2,432,034

UNITED STATES PATENT OFFICE 2,432,034

CHROMIUM COMPLEXES OF 1-PHENYL-5-METHYL-3-PYRAZOLONE AZO COMPOUNDS

Abby Ware Nies, Bound Brook, N. J., assignor to American Cyanamid Company, New York, N. Y., a corporation of Maine No Drawing. Application September 9, 1944, Serial No. 553,457

10 Claims. (Cl. 260—147)

This invention relates to new chromium complexes of azo dyestuffs and to a new process of producing them.

1-phenyl-3-methyl-5-pyrazolone is a very common coupling component and many azo dyes have been prepared which include this pyrazolone in the molecule. The isomeric 1-phenyl-5-methyl-3-pyrazolone was, up to recently, more or less a laboratory curiosity because commercially practical processes for its production were not available. In the Patent No. 2,227,654, January 7, 1941, to Lecher, Parker and Conn, there is described for the first time a practical commercial process of producing 1-aryl-5-methyl-3-pyrazolones. Therefore, it has become practical to use 1-phenyl-5-methyl-4-amino-3-pyrazolone as a diazo component in the preparation of azo dyes. Particularly it has now been discovered that by diazotizing 1-phenyl-4-amino-5-methyl-3-pyrazolone, coupling the resulting diazo compound with a coupling component capable of coupling in the ortho position to a lake-forming group, and metallizing the resulting azo dyestuff with a suitable chromium compound, chromium complexes may be produced which are valuable for dyeing basic nitrogenous fibers.

The present invention permits the production of chromium complexes of azo dyestuffs which could not be produced by the conventional methods of coupling diazotized amines with 1-phenyl-5-methyl-3-pyrazolones and a wide field of new dyes is therefore open. The great majority of known coupling components capable of yielding chromium complexes are usable in the present invention, and it is an advantage that the process is generally applicable. However, of particular interest are the acylacetic arylides, such as acetoacetic anilide, acetoacetic para-phenetidide, acetoacetic toluidides, acetoacetic xylidides, bis-acetoacetic-o-tolidide, benzoyl acetic anilide, acetoacetic-p-sulfanilide and the like; furthermore, 5-pyrazolones capable of coupling in position 4 such as, 1-phenyl-3-methyl-5-pyrazolone and its derivatives substituted in the phenyl group. Examples are 1-(4'-sulfophenyl)-3-methyl-5-pyrazolone, 1-(4'-sulfophenyl)-3-carboxy-5-pyrazolone and 1-(4'-sulfophenyl)-3-carbethoxy-5-pyrazolone. Also of particular interest are aromatic amines or diamines of the benzene and naphthalene series capable of coupling ortho to the amino group such as beta-naphthylamine, 2-naphthylamine-3,6-disulfonic acid, m-phenylene diamine, etc. The resulting azo dyestuffs are not obtainable in the majority of cases by the procedure wherein a 3-pyrazolone is used as a coupling component.

The resulting dyestuffs may also be dis- or poly-azo dyestuffs; thus, resorcinol or m-phenylene diamine may be coupled first with another diazo compound and then with the 3-pyrazolone diazo compound used in the invention, or it may be coupled twice with said coupling components.

The preferred chromium complexes of the present invention possess valuable properties. They are capable of dyeing many fabrics, particularly basic nitrogenous fabrics, level shades of excellent fastness. They have the important advantage that novel green and olive green shades are available for wool, which are difficult to obtain with other dyestuffs.

It is an advantage that the formation of the preferred chromium complexes does not require any new metallization technique. On the contrary, the customary methods may be employed, such as for example, refluxing or heating under pressure an aqueous solution of the azo dyestuff with suitable compounds containing trivalent chromium. Some typical examples of such agents are chromic hydroxide, chromic acetate, chromic formate, chromic chloride, chromic sulfate, basic chromate sulfate, chromic benzene sulfonate, chromic naphthalene disulfonate. The metallizing agents may be used in the presence or absence of agents designed to control the pH such as acids, bases and buffers.

Upon completion of metallization, the dyestuffs are isolated by filtration if of limited solubility. Others are salted from the aqueous solution, and are isolated by filtration and dried.

Most of the new products of the present invention are yellow to brown powders, some of which are quite soluble in water. Those of limited solubility are generally dissolved readily in dilute sodium carbonate solution.

The following examples are given to more fully illustrate the process of the present invention, and not by way of limitation. All parts are by weight unless otherwise noted. Where formulae are given in the examples of dyes having acid groups the formula represents the free acid.

*Example 1*

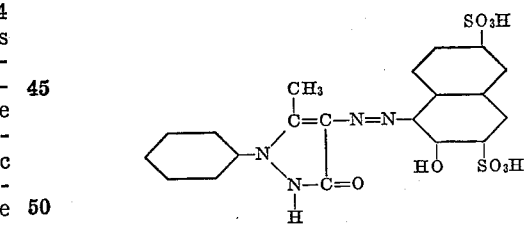

18.9 parts of 1-phenyl-4-amino-5-methyl-3-pyrazolone are dissolved in 500 parts of an aqueous solution containing 9.5 parts of hydrochloric acid. After cooling to 5° C., 6.9 parts of sodium nitrite dissolved in 20 parts of water are added. The solution of 1-phenyl-4-diazo-5-methyl-3-pyrazolone is then added to a solution of 38.3 parts of the disodium salt of 2-naphthol-3,6-disulfonic acid in 70 parts of 10% sodium carbonate solution. When coupling is complete, the dye is isolated by filtration, washed with 20% common salt solution and dried. The dyestuff is red in powder form, soluble in water and concentrated sulfuric acid, giving a red color to both.

Example 2

10 parts of the dyestuff prepared in Example 1, together with 50 parts of ammonium acetate and 5 parts of potassium dichromate are dissolved in 5000 parts of water. The solution is diluted with 25,000 parts of water and 20 parts of acetic acid added. 500 parts of wool which has been made wet are then entered and the dye bath brought slowly to a boil. After boiling one-half hour, an additional 20 parts of acetic acid are added and the boiling continued a half hour longer. The wool is then taken out, washed and dried. The 2% metachrome shade produced in this way is a pink.

Example 3

50.4 parts of the free acid of the dyestuff prepared in Example 1 are heated at reflux with 3,500 parts of basic chromic acetate solution which contain 20.8 parts of chromium. After one hour, 400 parts of 5% sulfuric acid are added and boiling continued 20 hours. Then 67 parts of 21% sulfuric acid solution are added and after an additional period of boiling, the metallized dye is isolated by filtration and washed with 20% common salt solution.

In powder form, the dyestuff is a brownish red color, soluble in water and in concentrated sulfuric acid giving a red solution.

Example 4

5 parts of the metallized dyestuff described in Example 3 are dissolved in 5,000 parts of water. The solution is diluted with 25,000 parts of water. 40 parts of 10% sulfuric acid are added. In this 10% solution are placed 500 parts of wool which has been made wet. The dye bath is boiled one and one-half hours. Then the wool is removed, washed with water and dried. The shade obtained in this way is an exceptionally bright blue-red shade of good fastness to washing and light.

Example 5

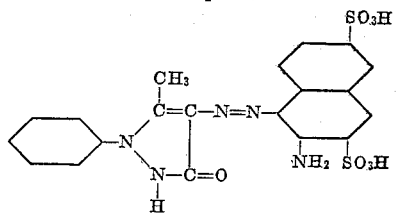

18.9 parts of 1-phenyl-4-amino-5-methyl-3-pyrazolone are mixed with 250 parts solution containing 24.5 parts of sulfuric acid. The solution is cooled to 5° C. and diazotized with 6.9 parts of sodium nitrite dissolved in 20 parts of water.

To this acid solution of diazo are added 43.4 parts of the disodium salt of 2-naphthylamine-3,6-disulfonic acid. The coupling is warmed to 40° C. and stirred at 40° C. until complete. The dyestuff is precipitated by adding anhydrous sodium carbonate until the mixture has a pH of 3.6 and then adding common salt until precipitation is complete. The dye is isolated by filtration, washed with 20% common salt solution and dried.

The azo dyestuff is a dark orange in powder form, soluble in water, giving a yellow-orange solution, and soluble in dilute hydrochloric acid solution, giving a red-violet color. It is soluble in concentrated sulfuric acid, imparting a brown color to the solution.

Example 6

10 parts of the azo dyestuff obtained in Example 5 are dissolved in 5,000 parts of water. 50 parts of Glauber's salt are added. The solution is diluted with 25,000 parts of water and 20 parts of acetic acid added. 500 parts of wool which has been made wet are added and the dye bath boiled for a half hour. Then 20 parts more of acetic acid are added and boiling continued for a half hour. The dyeing at this point is a yellow tone orange.

Then 5 parts of sodium dichromate are added and the dye bath boiled a half hour. The wool is then removed, washed with water and dried. The dyeing obtained is a taupe shade of good color value.

If instead of this dyeing method, the method of Example 2 is used, a similar taupe shade is obtained on wool.

Example 7

50.3 parts of the free acid of the dyestuff obtained in Example 5 are dissolved in 3,500 parts of water. To this solution are added 300 parts of basic chromic acetate solution containing 20.8 parts of chromium. The mixture is boiled thirty minutes when 26 parts of 5% sulfuric acid are added. After three more hours of boiling, another 26 parts of 5% sulfuric acid are added and boiling continued 16 hours. After cooling, the metallized dye is isolated by filtration, washed with water and dried. It is a green powder, soluble in concentrated sulfuric acid giving a yellow color.

When dyed according to the dyeing procedure described in Example 4, level green shades are obtained on wool which have good fastness to light.

Example 8

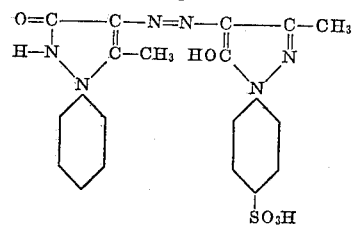

18.9 parts of 1-phenyl-4-amino-5-methyl-3-pyrazolone are dissolved in 500 parts of a solution containing 9.5 parts of hydrochloric acid and diazotized at 5° C. with 6.9 parts of sodium nitrite dissolved in 20 parts of water. To the solution of diazo are added 28 parts of 1-(4'-sulfophenyl)-3-methyl-5-pyrazolone and the mixture heated to 40° C. The coupling is stirred at 40° C. until complete. The dye is precipitated by salting, isolated by filtration, washed with 20% common salt solution and dried.

In powder form, the dyestuff is orange, dissolving in water to an orange solution, in 10% soda ash solution to a yellow color and giving a greenish yellow solution with concentrated sulfuric acid.

When dyed on wool using the procedure of Example 6, a red tone yellow is first obtained which changes to a tan of good color value after addition of sodium dichromate.

When dyed on wool using the dyeing method of Example 2, tan shades are obtained.

Example 9

45.4 parts of the dyestuff obtained in Example 8 are dissolved in 3,000 parts of water and heated at slow reflux with 350 parts of basic chromic acetate solution containing 20.8 parts of chromium for 16 hours. Then 130 parts of 5% sulfuric acid solution are added and heating at reflux continued until metallization is complete. After cooling, the dye is isolated by filtration, washed with 20% common salt solution and dried.

In powder form, the metallized dye is brown-yellow. It dissolves in hot water and 10% sodium carbonate solution with an amber color. In concentrated sulfuric acid, it is green-yellow.

When dyed on wool as described in Example 4, reddish yellow shades of good fastness are obtained.

Example 10

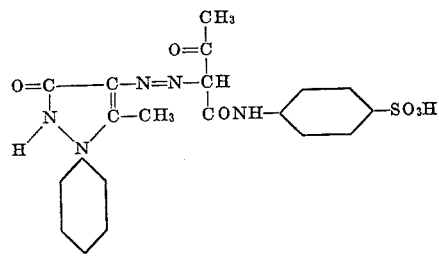

18.9 parts of 1-phenyl-4-amino-5-methyl-3-pyrazolone are dissolved in 500 parts of an aqueous solution containing 9.5 parts of hydrochloric acid. After cooling to 5° C., 6.9 parts of sodium nitrite dissolved in 20 parts of water are added. The solution of diazo is then added to a solution made by dissolving 27.0 parts of sodium acetoacetyl-p-sulfanilate in 300 parts of 10% of sodium carbonate solution at 10° C.

When coupling is complete, the coupling mixture is made acid to Congo Red paper by the addition of concentrated hydrochloric acid. The dyestuff is isolated by filtration and dried.

The dried azo dyestuff is a dark brown powder, difficultly soluble in water but soluble in 5% sodium carbonate solution, giving an amber color and in concentrated sulfuric acid, giving an olive shade.

When dyed according to the method of Example 2, a tan shade is obtained on wool.

Example 11

42.1 parts of the free acid of the dyestuff obtained in Example 10 are mixed with 1,000 parts of water and 310 parts of basic chromic acetate solution containing 10.4 parts of chromium. The mixture is heated to boiling and boiled for one-half hour. Then 200 parts of 5% sulfuric acid solution are added and boiling continued until metallization is complete.

The slurry of metallized dye crystals is cooled and the dye isolated by filtration, washed with water and dried.

The dry, metallized dyestuff is a brown powder, insoluble in water but soluble in dilute sodium carbonate solution and concentrated sulfuric acid, giving yellow-brown shades in both.

When 5 parts of the metallized dyestuff are dissolved in 5,000 parts of water with the addition of soda ash, and proceeding according to the dyeing method of Example 4, brownish yellow shades are obtained on wool of good fastness.

I claim:

1. Chromium complexes of an azo dyestuff of the formula:

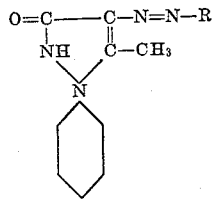

wherein R is the radical of a coupling component selected from the group consisting of acylacetic arylides and 5-pyrazolones having a double bond in the ring between the 2-nitrogen atom and the 3-carbon atom and capable of coupling in the 4 position, and naphthylamine sulfonic acids capable of coupling in the ortho position to the amino group.

2. Chromium complexes of an azo dyestuff according to claim 1 in which the radical of the coupling component is the radical of an acylacetic arylide.

3. Chromium complexes of an azo dyestuff according to claim 1, in which the radical of the coupling component is the radical of an acetoacetic arylide.

4. Chromium complexes of an azo dyestuff according to claim 1, in which the radical of the coupling component is the radical of an acetoacetic-p-sulfanilide.

5. Chromium complexes according to claim 1 in which the radical of the coupling component is the radical of a 5-pyrazolone having a double bond in the ring between the 2-nitrogen atom and the 3-carbon atom and capable of coupling in the 4-position.

6. Chromium complexes according to claim 1 in which the radical of the coupling component is the radical of a 1-sulfonated phenyl-3-methyl-5-pyrazolone having a double bond in the ring between the 2-nitrogen atom and the 3-carbon atom and capable of coupling in the 4-position.

7. Chromium complexes according to claim 1 in which the radical of the coupling component is the radical of 1-(4'-sulfophenyl)-3-methyl-5-pyrazolone having a double bond in the ring between the 2-nitrogen atom and the 3-carbon atom and capable of coupling in the 4-position.

8. Chromium complexes according to claim 1 in which the radical of the coupling component is the radical of a naphthylamine sulfonic acid capable of coupling in the ortho position to the amino group.

9. Chromium complexes according to claim 1 in which the radical of the coupling component is the radical of a 2-naphthylamine sulfonic acid capable of coupling in the position ortho to the amino group.

10. Chromium complexes according to claim 1 in which the radical of the coupling component is the radical of 2-naphthylamine-3,6-disulfonic acid.

ABBY WARE NIES.

REFERENCES CITED

The following references are of record in the file of this patent:

UNITED STATES PATENTS

| Number | Name | Date |
| --- | --- | --- |
| 2,227,654 | Lecher et al. | Jan. 7, 1941 |

OTHER REFERENCES

Beilstein, Handbuch, 4th ed., vol. 25, pp. 551, 533–534.